United States Patent [19]

Koppelmann et al.

[11] 4,355,932
[45] Oct. 26, 1982

[54] INDEXABLE SPADE DRILL BLADE

[75] Inventors: Eldo K. Koppelmann, Cumberland; Wayne E. Blackmun, Barrington, both of R.I.

[73] Assignee: Santrade Ltd., Lucerne, Switzerland

[21] Appl. No.: 110,765

[22] Filed: Jan. 9, 1980

[51] Int. Cl.³ .................. B23B 27/16; B23B 51/06; E21B 10/52
[52] U.S. Cl. .................... 408/188; 175/383; 407/54; 408/233; 408/713
[58] Field of Search ............. 408/188, 233, 231, 713; 407/54, 113, 114; 175/383, 401

[56] References Cited

U.S. PATENT DOCUMENTS

| | | | |
|---|---|---|---|
| 1,365,683 | 1/1921 | Griffith | 407/113 X |
| 2,621,548 | 12/1952 | Williams | 407/54 X |
| 3,333,489 | 8/1967 | Mossberg | 408/233 X |
| 3,629,919 | 12/1971 | Trevarrow, Jr. | 407/113 X |
| 4,047,826 | 9/1977 | Bennett | 407/113 X |
| 4,060,335 | 11/1977 | Holloway et al. | 408/233 |
| 4,083,644 | 4/1978 | Friedline | 407/113 X |
| 4,115,024 | 9/1978 | Süssmuth | 408/188 X |

FOREIGN PATENT DOCUMENTS

| | | | |
|---|---|---|---|
| 2644827 | 4/1978 | Fed. Rep. of Germany | 408/233 |
| 2843433 | 4/1980 | Fed. Rep. of Germany | 407/114 |

Primary Examiner—Z. R. Bilinsky
Attorney, Agent, or Firm—Barlow & Barlow

[57] ABSTRACT

The present invention relates generally to spade drills and more particularly to an indexable spade drill blade which is adapted to be clamped in the clamp slit of a boring bar or holder and which may be readily reversed so that an unused cutting edge may be brought into play for further boring when wear has taken place on the cutting edges. Essentially the spade cutting blade is formed with an eccentric to permit indexing and must be used with an appropriate boring bar or holder which has a shape such that the cutting point of the eccentric blade is brought on the shank center line of the boring bar or holder.

1 Claim, 7 Drawing Figures

INDEXABLE SPADE DRILL BLADE

BACKGROUND OF THE INVENTION

It is known in the art to provide a boring bar with a cutting bit and particularly one in which the cutting point could be changed. This is especially true in the rock drill art where one finds prior disclosures as in U.S. Pat. Nos. 3,878,905 and 2,575,239. In each of these disclosures a piece of carbide is put into a slot. The problems that are attendant in the metal cutting industry are not present in a rock drill. In other words, there is no reason to provide back taper, no reason to provide any particular cutting angles, no problem in chip formation or in producing accurate size. As a matter of fact, there is not strict tolerance because one only needs to cut a hole to provide a diameter and length sufficient to drop a stick of dynamite into the rock. In the metal cutting art a classic example of the spade drill is seen in U.S. Pat. No. 3,076,357 and again in U.S. Pat. No. 3,460,409. Some attempts at constructing indexable spade drills have been made and these prior art attempts are seen in U.S. Pat. Nos. 4,060,335 and 4,115,024. Some difficulty has been experienced with the last mentioned prior art devices particularly that were noted in the fact that it was very difficult to accurately place the spade drill in the holder in such a way that the cutting point was on the center line. Further, it was noted that, in effect, there was some deflection in the bar that was experienced, and effectively, the bar would bend so that one could never get the same size hole with two different bores if one, for example, reduced the feed rate. Particular difficulty was found in trying to provide a balanced spade drill bit of the indexable type in that if one made the edges of the bit so that they would contact the bore throughout, first the cutting edge wore, then the back edges would break away, and the whole purpose of having an indexable and/or reversible bit would be lost.

SUMMARY OF THE INVENTION

With the foregoing in mind it is the principal object of this invention to provide an indexable spade drill in which the blade is firmly and accurately clamped in the holder or boring bar so that it will withstand the torque and axial thrust loads and also one in which the blade and the seat for the blade in the bar or holder is eccentric to the center line of the boring bar. Effectively, the spade drill blade is formed in such a way that when viewed lying flat, the two opposed cutting points are offset from each other. The holder has a seat which is likewise offset by the same amount, and in this fashion both lips of the drill are cutting, however, due to the eccentric construction there is only one cutting the finished hole size. Additionally, the drill blade has the necessary back taper thereon so that the back edge does not engage the bore and can be provided with the usual chip breaker slots. In order to insure proper indexing, one side of the blade is provided with a parallel slot and offset from the center of the blade holder slot is a protruding pin which insures that the blade is properly positioned within the slot of the boring bar at all times. It will be apparent that in accordance with the invention when one cutting end is worn out, the opposite cutting end may be used after 180° rotation of the spade drill blade.

DESCRIPTION OF THE PREFERRED EMBODIMENT

Figure 1:
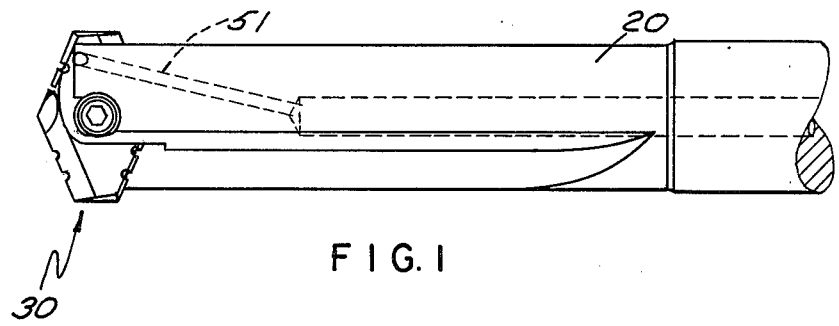
FIG. 1 is a top plan view of a spade drill bit and holder therefor made in accordance with the invention.
Figure 2:
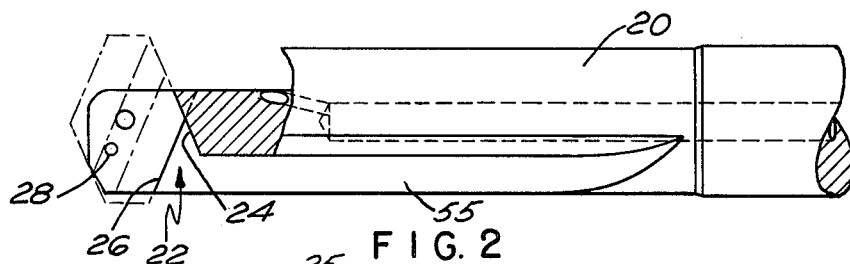
FIG. 2 is a similar view with parts broken away to show the holder slot.
Figure 6:
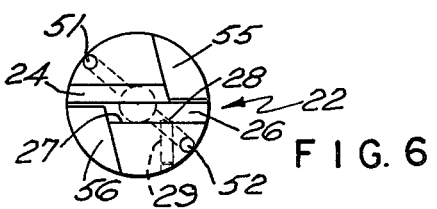
FIG. 6 is a front end view of the boring bar showing the slot to receive the drill blade.

Referring now to the drawings, it is shown in FIGS. 1 and 2 a spade drill holder or boring bar 20 which has at the end remote from the driving end a diametrical slit or slot generally designated 22 cut therein as seen more particularly in FIG. 6. The slot which forms the holder for the drill blade is formed preferably by two milling cuts so that there is provided a pair of abutment surfaces 24 and 26 that extend completely across the diameter of the boring bar or tool holder but effectively for only one half of the width of the complete clamping slot 22. It should be said that the bottom portion of the slot 26 defines a floor and this may be designated 27 and rising from that floor for a very short distance is the end of a pin which passes through a bore 29, the protruding end of the pin 28 being visible in FIG. 6.

Figures 3, 4, 5:
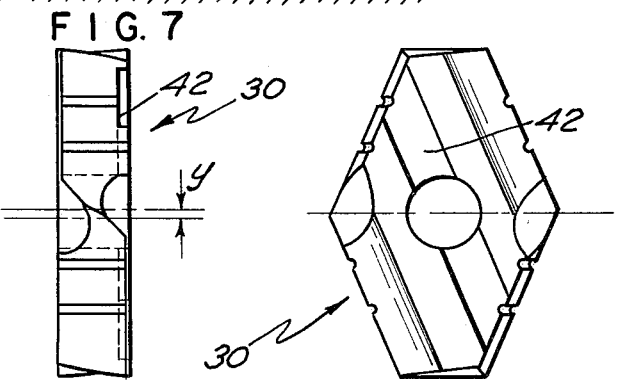
FIG. 3 is a plan view of the drill blade embodying the invention.
FIG. 4 is a front view showing the cutting point.
FIG. 5 is a bottom plan view of the drill blade.

A double ended spade drill blade 30 is provided for association with the boring bar or holder and particularly for seating within the slot 22. To this end, the blade is provided with opposite sets of cutting ends and more particularly, as seen in FIG. 3, will have cutting ends 32, 32' with an opposite cutting ends 34, 34'. Essentially the drill blade is a modified rhomboid which is formed with unequal sides. As seen in FIG. 3, there is one side that has a dimension x while a second side has the dimension x-a. These adjacent sides in drill bit terminology are called cutting ends. In forming the blade in this fashion, effectively the drill points are offset from each other and by an amount that we have designated in FIG. 4 to be y, y being the distance that the center points of the blade are eccentric. In like fashion the holder 22 has the flats 24 and 26 made therein in such a way that they too are eccentric, equal to "y".

Figure 7:
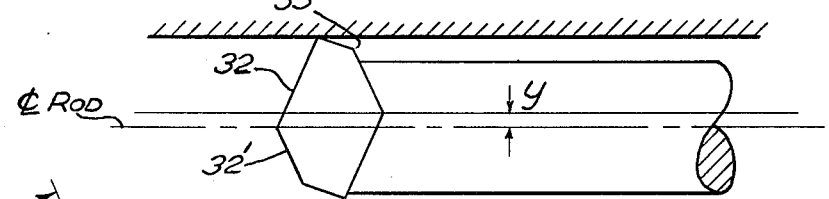
FIG. 7 is a greatly exaggerated diagrammatic view illustrating the principle of the invention.

The eccentricity and the manner in which the blade operates is seen better by viewing FIG. 7 where the parts have been enlarged and thrown out of proportion to illustrate this particular point. Here the center line of the boring bar and the hole into which the boring bar extends has been illustrated by the usual broken line labeled "$\mathcal{L}$ Rod". It will be seen that the blade has its outer point on the center line while the point that is not in use is resting within the holder offset from the center line. Further, it will be noted that the cutting ends such as 32, 32' are being utilized and end 32 is the one which is boring the hole to its proper diameter. Also in the diagram it is clear that back taper as at 35 is provided on the diametral cutting edge of the blade, which end edges of the blade have been designated 36 and 37. From a practical standpoint it has been found advantageous to make the bit eccentric on the order of 0.010", although many variations may be used, and therefore, since it is not essential but purely by way of practical application it is suggested that the eccentricity range from 0.2 mm to 0.3 mm or 0.008 to 0.011". As has been briefly eluded to above, the blade is made so that it will positively index and as seen in FIG. 5 there is a slot in the blade, the slot being designated 42, which slot will engage the head of the pin 28. In FIG. 2 of the drawings the slot 42 may be said to be engaged with the pin 28 which is shown in broken lines. As is usual in drill blades of this type, the holder is provided with a suitable clamping device and the simplest form thereof is thru a socket head cap screw which will pass through the central bore 45 of the blade, and when the screw is tightened down, it will effectively squeeze the slot together holding the drill blade in place.

It will also be noted that, purely by way of example, the boring bar has been shown with coolant slots, there being a central coolant bore 50 with a pair of ducts 51 and 52 leading therefrom for delivering coolant to the bottom of the bore being cut which is advantageous and also assists in the forcing of the chips out through the chip slots 55, 56 that are provided in the boring bar.

It will therefore be seen that this invention provides a particular spade drill blade in which the blade is a replaceable element that could be readily clamped into a clamping slit or slot and one which is economical to produce and can readily be of the throw-away variety or if more durability is desired to be manufactured from carbide instead of tool steel. The blade itself provides a rather unique construction and, of course, must be utilized with a specific boring bar and indeed, both the blade and the boring bar have eccentricity set therein.

In effect, the blade is sharpened with appropriate cutting geometry to include point thinning, rake angles and cutting clearances as required for proper cutting results. The eccentricity provides a unique advantage in the indexability of the blade and there is no tendency for the drill to bind or run off center or, as a matter of fact, bend the boring bar as is very common in similar units of the prior art.

We claim:

1. An indexable spade drill having a boring bar with a clamping slot defining opposite surfaces, a pin rising from one surface into the slot, a blade having a substantially rhomboidal block formation with parallel top and bottom faces, said block having a first pair of adjacent sides defining a first cutting end the junction of which has a first pointed end, said block having a pair of opposite sides defining a second cutting end, the junction of which has a second pointed end, said blade having diametral cutting edges that join the first and second pairs of adjacent sides, the blade clamped in said clamping slot that supports the blade axially and laterally, one of the faces of the blade having a groove extending in the direction parallel to at least one side, a central bore extending between the two faces of said blade, said groove being located to intersect the bore, a clamping bolt extending across the slot to clamp the blade, said pin engaging a portion of said groove whereby when the blade is rotated a half a revolution in its plane to present an opposite pointed end the pin will engage another portion of said groove.

* * * * *